United States Patent
Toyooka et al.

(10) Patent No.: US 6,949,728 B2
(45) Date of Patent: Sep. 27, 2005

(54) IMPEDER FOR MANUFACTURING WELDED PIPE

(75) Inventors: Takaaki Toyooka, Tokyo (JP); Takatoshi Okabe, Tokyo (JP); Motoaki Itadani, Tokyo (JP); Masatoshi Aratani, Tokyo (JP); Osamu Kondo, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 132 days.

(21) Appl. No.: 10/476,800

(22) PCT Filed: Aug. 2, 2001

(86) PCT No.: PCT/JP01/06662

§ 371 (c)(1),
(2), (4) Date: Nov. 6, 2003

(87) PCT Pub. No.: WO03/013777

PCT Pub. Date: Feb. 20, 2003

(65) Prior Publication Data

US 2004/0155031 A1 Aug. 12, 2004

(51) Int. Cl.[7] .......................... B23K 13/01; B21D 39/00
(52) U.S. Cl. ...................................... 219/613; 228/144
(58) Field of Search ................. 219/613, 602, 219/600, 601, 612, 607, 670; 228/144, 145, 146, 147–152, 173.6, 173.7, 166

(56) References Cited

U.S. PATENT DOCUMENTS

| | | | | |
|---|---|---|---|---|
| 3,037,105 A | * | 5/1962 | Kohler | 219/612 |
| 3,270,176 A | * | 8/1966 | O'Neill et al. | 219/613 |
| 3,349,212 A | * | 10/1967 | Morris et al. | 219/61.12 |
| 3,511,957 A | * | 5/1970 | Cannon et al. | 219/613 |
| 5,954,985 A | * | 9/1999 | Scott et al. | 219/666 |
| 6,018,859 A | * | 2/2000 | Borzym et al. | 29/458 |
| 6,629,632 B1 | * | 10/2003 | Jack et al. | 228/147 |

FOREIGN PATENT DOCUMENTS

| | | |
|---|---|---|
| JP | 58-50186 | 3/1983 |
| JP | 59-24587 | 2/1984 |
| JP | 2000-52059 | 2/2000 |
| JP | 2001-212677 | 8/2001 |

* cited by examiner

Primary Examiner—Daniel Robinson
(74) Attorney, Agent, or Firm—Young & Thompson

(57) ABSTRACT

An impeder, for manufacturing a welded pipe, including an insulating case 4 containing laminations 10 having coated steel sheets 8 formed by providing an insulating coating on untreated steel sheets having a thickness of 0.3 mm or less and an insulating case 8 containing the laminations, wherein the steel sheets contain 1.5–20% of Cr, 2.5–10% of Si, and 100 ppm or less of C and N in total, or further contain one or more of Al, Mn, and P, where the content of Al is 5% or less and the content of each of Mn and P is 1% or less, the remainder being Fe and unavoidable impurities; and preferably have a resistivity of 60 $\mu\Omega$·cm or more.

4 Claims, 5 Drawing Sheets

(a)

(b)

ENLARGED PORTION A (a)

(b)

IMPEDER FOR MANUFACTURING WELDED PIPE

TECHNICAL FIELD

The present invention relates to impeders for manufacturing welded pipes. The present invention particularly relates to an impeder for manufacturing a welded pipe, wherein the welded pipe is manufactured according to the following procedure: a strip skelp is continuously processed into a cylindrical body so as to make the skelp edges, which are to be a welding portion, form a straight line or a spiral, and the skelp edges are then heated and welded by a high-frequency induction welding method or a high-frequency resistance welding method. The impeder is placed in the cylindrical body in order to increase the thermal efficiency of the welding.

BACKGROUND ART

As shown in FIG. 7(a), in a step of manufacturing a welded pipe, for example, a step of manufacturing a welded pipe by a high-frequency induction welding method, a skelp 1 having a strip shape is processed into a cylindrical body, heated with an induced current generated by supplying a current to a work-coil 2, pressed by welding rollers 3, and then welded at a V-shaped convergent portion (a welding portion) consisting of the skelp edges facing each other.

An impeder, which is placed in a cylindrical body in order to increase the thermal efficiency of welding, includes a case 4 comprising an insulating material and a core 5 comprising a magnetic material, and the impeder is connected to a mandrel 6. The core 5 is cooled with cooling water supplied through the mandrel 6, in order to maintain the performance during welding. The purpose of using the impeder is to increase the thermal efficiency of welding in such a manner that the core 5 is excited with a high-frequency current flowing in the work-coil 2 to prevent an induced current from being supplied to the inside of the cylindrical body to make a welding current supplied through the skelp edges converge on the welding portion.

Thus, cores for impeders need to have the following characteristics: first, high permeability and high saturation magnetic flux density; second, high resistivity, low core loss, and superior workability for forming a shape suitable for cooling; and third, high Curie temperature and small change in magnetic characteristic when the temperature is increased due to heat generated during operation.

As shown in FIG. 7(b), a conventional core includes a ferrite core 5A comprising an oxide-magnetic material prepared by sintering ferrite powder 50. Reference numeral 51 represents a binder.

In high-frequency welding, since a large welding current is supplied and a ferrite core having a small cross-sectional area is used when a pipe having a small diameter is manufactured, the magnetic flux density is readily saturated with respect to the strong magnetic field, thereby decreasing the thermal efficiency of welding. Furthermore, there is a problem in that the saturation flux density of the ferrite core is significantly lowered when the ferrite core generates heat due to the core loss during operation. There is also a problem in that the ferrite core is readily broken because the ferrite core is hard and fragile.

Owing to the above problems, the impeder including the ferrite core has the following disadvantages: low thermal efficiency of pipe welding and short life.

In order to overcome the above disadvantages, an impeder including a core prepared in the following manner has been proposed: a magnetic metal material such as silicon steel having high saturation magnetic flux density is processed into steel sheets 71 having a small thickness and width, as shown in FIG. 8(a), and the steel sheets 71 are bonded with an insulating adhesive agent 72 to form magnetic metal laminations 7, the plurality of magnetic metal laminations 7 are placed in the insulating case 4 to form the core, as shown in FIG. 8(b).

The following techniques for suppressing the heat generation of the impeder are known: a technique (disclosed in Japanese Patent Publication No. H7-14557B) in which magnetic metal wires having an extremely small diameter are tied in a bundle and then stacked, and another technique (disclosed in Japanese Patent Publication No. S61-31959B) in which extremely thin magnetic metal sheets having a thickness of 0.1 mm or less are stacked with insulating materials placed therebetween to form a lamination having a cross-sectional area of 50 mm$^2$ or less.

In the above conventional techniques, the purpose is to obtain a predetermined welding efficiency and to suppress the heat generation simultaneously.

As the demand of steel pipes has been recently increasing, the productivity of the steel pipes must be further raised. Therefore, it is necessary to increase the rate of manufacturing the steel pipes. In the use of the above conventional impeder, a current cannot be sufficiently converged on a welding portion when the pipe-manufacturing rate is raised. In order to achieve a high pipe-manufacturing rate, the capacity of a high frequency power source may be increased. However, such a method raises the manufacturing cost and consumes much energy.

There are many sizes of welded pipes. Since the impeder size must be changed depending on each pipe size, impeders used in a manufacturing process must be replaced when the pipe size is changed. The replaced impeders are put in storage for the next possible use. However, the following situation often arises during storage: the magnetic metal of the core corrodes away due to cooling water being left in the insulating case and therefore the impeders cannot be used again.

DISCLOSURE OF INVENTION

In order to solve the above problems, it is an object of the present invention to provide an impeder for manufacturing a welded pipe and a method for manufacturing a welded pipe, wherein the impeder can greatly increase the welding efficiency and has a long life and high corrosion resistance.

The inventors have eagerly conducted experiments and studies on a method for improving the corrosion resistance, the welding efficiency, and the life of an impeder equipped with a core including a plurality of laminations having steel sheets. As a result, the inventors found that the corrosion resistance of the core can be greatly improved and therefore the core can be used repeatedly, as shown in FIG. 2, when the quantity (herein referred to as content) of Cr of steel sheets used for the laminations is 1.5% or more.

In the description of the chemical composition, the unit % means the unit % by mass and the unit ppm means the unit ppm by mass.

Furthermore, the inventors found that the welding efficiency (the evaluation of the rate of manufacturing a pipe) can be greatly increased, as shown in FIG. 3, when the Cr content of the steel sheets is 1.5% or more, the Si content is 2.5% or more, and the total C and N content is 100 ppm or less.

Furthermore, it has become evident that the core life can be extended, as shown in FIG. 4, according to the following phenomenon: when the steel sheets have a resistivity of 60 $\mu\Omega\cdot$cm or more, an induced current in the core is effectively reduced and therefore the quantity of the Joule heat is reduced to suppress the deterioration of the core caused by heat.

Furthermore, the inventors found that adhesive agents, which are used for joining the steel sheets together and contain an epoxy resin and the like, not only lower the corrosion resistance of the core but also shorten the life by promoting the heat generation of the steel sheets.

Based on the above findings and further studies, the present invention has been completed. The present invention can be summarized as follows:

(1) an impeder, for manufacturing a welded pipe, including laminations having coated steel sheets formed by providing an insulating coating on untreated steel sheets having a thickness of 0.3 mm or less and including an insulating case containing the laminations, wherein the steel sheets contain 1.5–20% of Cr, 2.5–10% of Si, and 100 ppm or less of C and N in total, or further contain one or more of Al, Mn, and P, where the content of Al is 5% or less and the content of each of Mn and P is 1% or less, the remainder being Fe and unavoidable impurities;

(2) the impeder as described in the above section (1), wherein the steel sheets have a resistivity of 60 $\mu\Omega\cdot$cm or more;

(3) the impeder as described in the above section (1) or (2), wherein the laminations include the coated steel sheets directly stacked and laminated; and (4) the impeder as described in any one of the above sections (1) to (3), wherein the laminations are contained in the insulating case with a filling factor of 3% or more.

Figure 1:
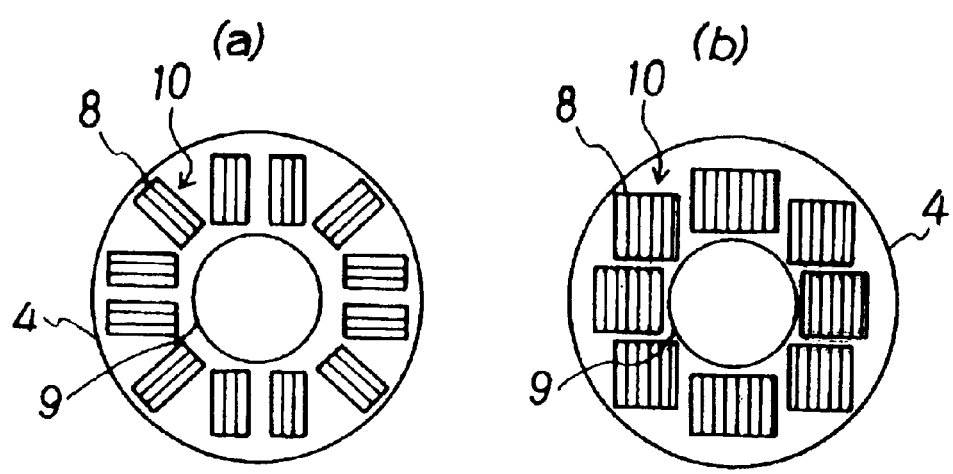
FIG. 1 is a sectional view showing an exemplary configuration of an impeder according to the present invention.
Figure 2:
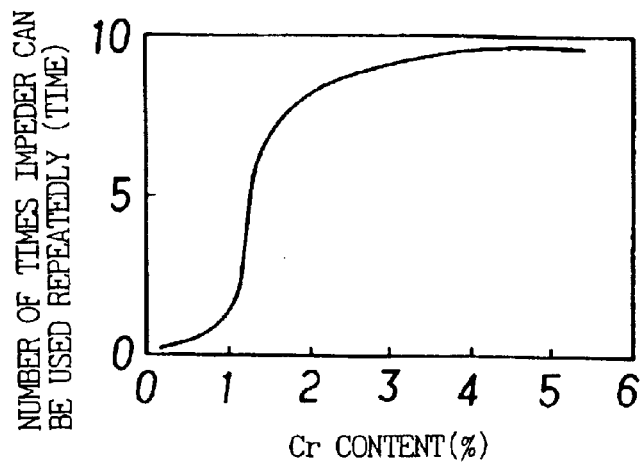
FIG. 2 is a graph showing the relationship between the limit of the number of times the impeder can be used repeatedly and the Cr content of steel sheets used for a core of the impeder.

REFERENCE NUMERALS 1. skelp (material for welded pipe)
2. work coil
3. welding roller
4. case (insulating case)
5 core
5A ferrite core
6 mandrel
7 magnetic metal lamination
8 coated steel sheet
9 rod
10 lamination
11 binder (string, tape, and the like)
20 pipe
21 virtual circle including a portion of laminations in a pipe, the portion being the closest to the center of the pipe
71 steel sheet
72 insulating adhesive agent

BEST MODE FOR CARRYING OUT THE INVENTION

FIG. 1 is a sectional view showing an exemplary configuration of an impeder according to the present invention. In FIG. 1, reference numeral 10 represents laminations including coated steel sheets 8 which are stacked, and a core has an insulating case 4 and the plurality of laminations 10 placed in the case 4. The laminations 10 are preferably arranged around a rod 9. uniformly, as shown in the figure. The arrangement includes a radial arrangement (FIG. 1($a$)) and a parallel arrangement (FIG. 1($b$)).

In the present invention, the chemical composition of steel sheets (steel sheet portion except for the coating of the coated steel sheets) is limited as described below. The reasons will now be described.

Cr: 1.5–20%

Cr is an element that improves the corrosion resistance and the toughness. Such an effect can be obtained when the Cr content is 1.5% or more, and the effect is leveled off when the Cr content is more than 20%. Therefore, the Cr content is 1.5–20%.

Si: 2.5–10%

Figure 3:
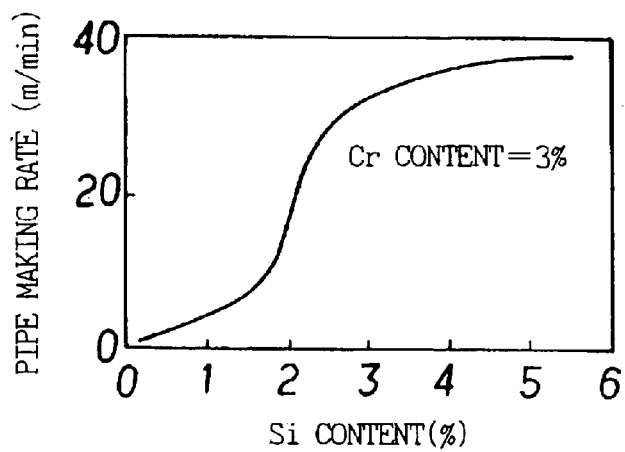
FIG. 3 is a graph showing the relationship between the rate of manufacturing a pipe during operation of the impeder and the Si content of steel sheets used for a core of the impeder.

Si is an element that improves the electromagnetic characteristics, and therefore the welding efficiency is significantly increased when the Si content is 2.5% or more (FIG. 3), in the present invention. In contrast, when the Si content is more than 10%, the rolling cannot be readily performed due to the excessively high hardness, and therefore the cost for manufacturing the steel sheets is raised.

Both C and N: 100 ppm or less in total

C and N bond to Cr and Si to form carbides and nitrides, respectively, thereby lowering the corrosion resistance-improving effect of Cr and the electromagnetic characteristic-increasing effect of Si. These negative effects are serious when the total C and N content is more than 100 ppm. The lower limit of the content is not particularly limited and is about 1 ppm in the current manufacturing methods.

One or more of Al, Mn, and P: 5% or less of Al, 1% or less of each of Mn and P

Al is an element that improves the electromagnetic characteristics, and therefore the content thereof is preferably 0.005% or more. However, when the Al content exceeds 5%, the toughness of the steel sheets is deteriorated, and therefore the Al content is 5% or less.

Mn and P are elements that contribute to improve the electromagnetic characteristics, and therefore they may be contained according to needs. When each content exceeds 1%, the cost is high. Therefore, the content is 1% or less.

The remainder except for the above elements is Fe and unavoidable impurities. Among the impurities, the O content is preferably 50 ppm or less in order to obtain a desirable toughness and the S content is preferably 20 ppm or less in order to obtain a desirable toughness also.

Figure 4:
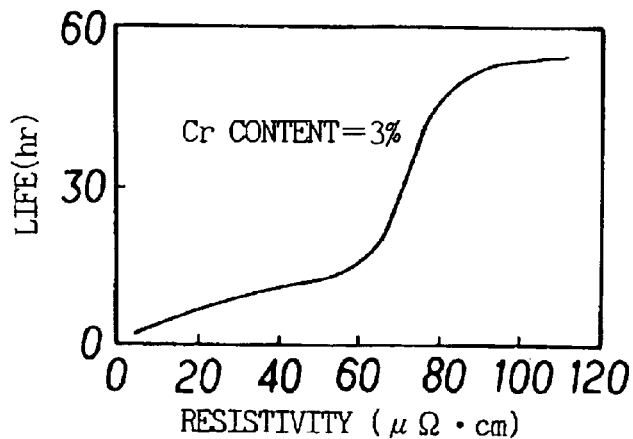
FIG. 4 is a graph showing the relationship between the life of the impeder and the resistivity of steel sheets used for a core of the impeder.

In the present invention, it is essential for the steel sheets to have a resistivity of 60 $\mu\Omega\cdot$cm or more in addition to the above requirements for the steel sheets. When the resistivity is less than 60 $\mu\Omega\cdot$cm, the life is short due to the large Joule heat generated during operation. When the resistivity is increased from 60 $\mu\Omega\cdot$cm to 80 $\mu\Omega\cdot$cm, the life is remarkably extended. However, when the resistivity exceeds 80 $\mu\Omega\cdot$cm, the life has a high value and is not significantly extended (FIG. 4). Thus, the resistivity is 60 $\mu\Omega\cdot$cm or more because of the remarkable extension of the life. More preferably, the resistivity is 80 $\mu\Omega\cdot$cm or more because the life is saturated at a high value. It is not necessary to set the upper limit of the resistivity.

Since the effect of increasing the welding efficiency is lowered when the steel sheets have a thickness of more than 0.3 mm, the steel sheet thickness is limited to 0.3 mm or less.

In order to make the steel sheets in the laminations have sufficient insulation properties, the steel sheets to be stacked are coated with a insulating material having heat resistance to prepare coated steel sheets, which are then stacked, wherein the insulating material is preferably resistant to a temperature of 800° C. or more. When the insulating coating has an excessively small thickness, the insulation between the steel sheets in the laminations is degraded to shorten the core life.

The insulating material includes inorganic materials (magnesium phosphate, aluminum oxide, calcium, and the like). Some of organic materials (epoxy resins, acrylic resins, methacrylic resins, and the like) deteriorate the corrosion resistance and promote the heat generation. Therefore, when an organic material is used, it must be carefully chosen.

Figure 5:
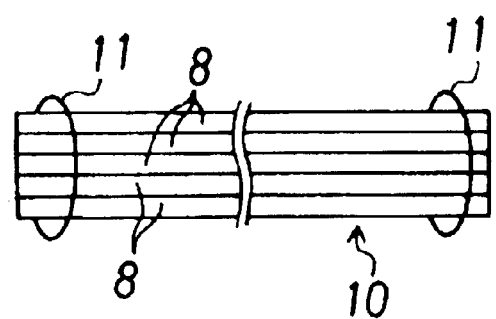
FIG. 5 is an illustration showing a preferred method for making the shape of a lamination according to the present invention.

When the steel sheets are joined together, an adhesive agent containing an epoxy resin or the like is usually applied onto each steel sheet to fix the steel sheets to form the laminations. However, this method is not preferable as described above. In the present invention, it is preferable to directly stack the coated steel sheets without applying an adhesive agent onto each steel sheet. As shown in FIG. 5, in this method, it is preferable to bind the ends of each lamination 10 including the coated steel sheets 8, which are directly stacked, with binders 11 such as strings and tapes. A material (such as a ceramic or a heat resistant resin) having superior insulating properties and heat resistance is preferably used for the binder.

When the insulating case contains the laminations, the filling factor (definition: the ratio of the cross-sectional area of the space in the insulating case to the cross-sectional area of the core) is preferably 3% or more. When the filling factor is less than 3%, the welding efficiency cannot be increased. As the filling factor is higher, the welding efficiency is larger. The filling factor is more preferably 70% or more.

Figure 6:
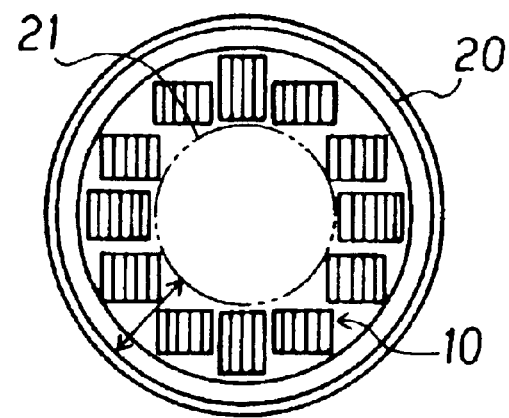
FIG. 6 is a schematic view illustrating the preferred distance between the lamination and the inner wall of a pipe.
Figure 7:
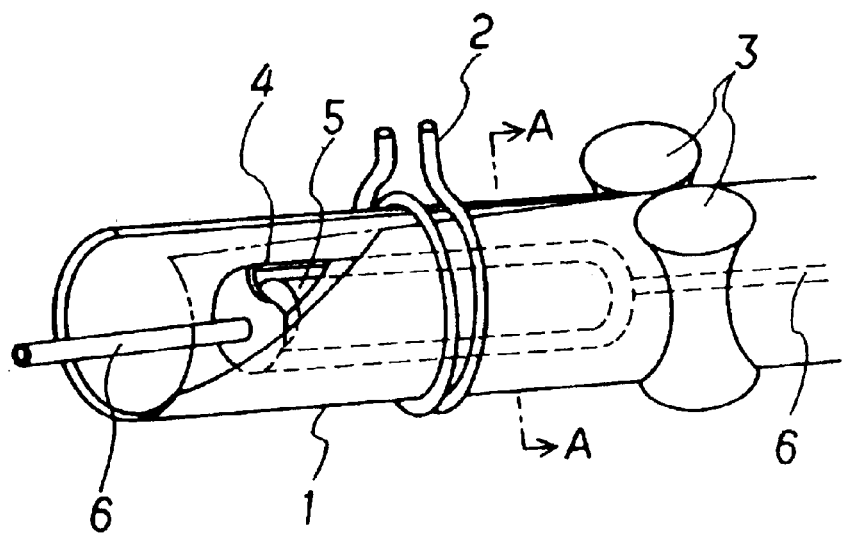
FIG. 7($a$) is a schematic view illustrating a step of manufacturing a pipe by high-frequency induction welding, and FIG. 7($b$) is a sectional view showing a conventional ferrite core taken along the line A—A.
Figure 7:
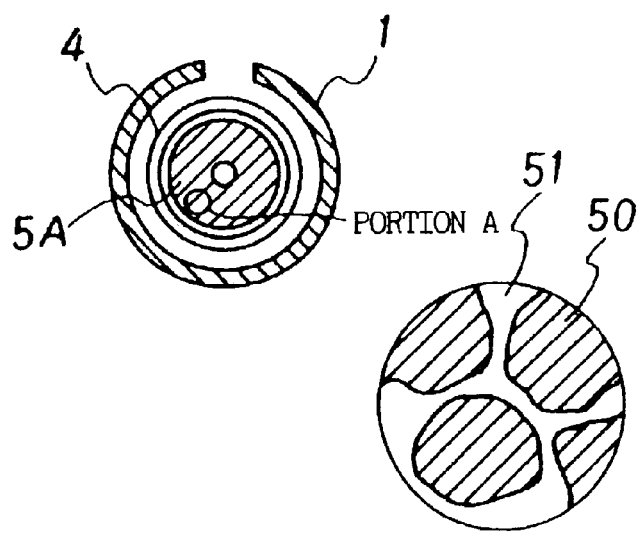
Figure 8:
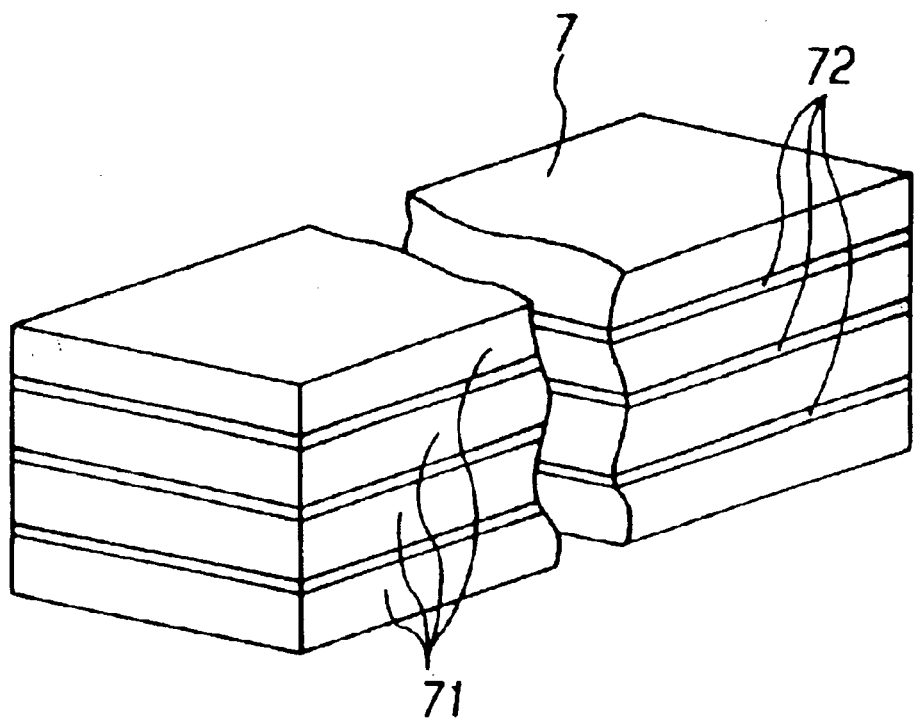
FIG. 8($a$) is a schematic view showing a conventional magnetic metal lamination, and FIG. 8($b$) is a sectional view showing the conventional magnetic metal lamination taken along the line A—A.
Figure 8:
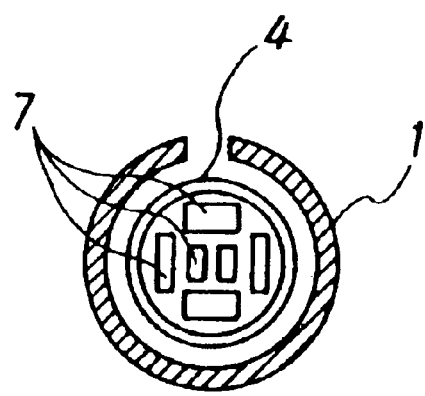

As shown in FIG. 6, when a welded pipe is manufactured using an impeder of the present invention, the impeder preferably has the following configuration depending on the diameter of the pipe 20 to be manufactured: all of the laminations 10 in the impeder are disposed in the region between the inner wall of the pipe and the portion indicated by the broken line, and the minimum distance between the inner wall and the indicated portion is 300 mm or less. According to the above configuration, the welding efficiency can be further increased.

EXAMPLE

Skelps, which are used for manufacturing welded pipes, comprising 0.07% C–0.1% Si–0.6% Mn steel and having a thickness of 5.0 mm were electrically welded by a high frequency induction welding method (a frequency of 70 kHz and an output of 700 kW) to manufacture welded pipes having the inner diameters shown in Table 1. In this manufacture, an impeder was placed in each pipe to perform electric welding with cooling water fed through to the impeder. The rate (which is in proportion to the welding efficiency) of manufacturing a pipe, the number of times the impeder was repeatedly used, and the impeder life were investigated.

According to Table 1, Examples of the present invention are superior in three items, namely, the pipe-manufacturing rate, the number of times the impeder was used, and the life. In contrast, Comparative Examples are inferior to Examples in one or more of the three items, particularly in number of times the impeder was used and in life.

TABLE 1

| | Impeder | | | | | | | | | | | | | |
|---|---|---|---|---|---|---|---|---|---|---|---|---|---|---|
| | Steel Sheet | | | | | | | | | insulating coating | | Lamination | | Filling |
| No | Cr % | Si % | Al % | C ppm | N Ppm | Mn % | P % | R*1 $\mu\Omega\cdot$cm | T*2 mm | Material | T,*2 $\mu$m | Fixing Method | Arrangement | Factor % |
| 1 | 1.5 | 2.5 | 0.005 | 20 | 20 | 0.5 | 0.1 | 60 | 0.1 | MgPO*3 | 1 | EB*4 | Para*6 | 70 |
| 2 | 1.5 | 2.5 | 0.005 | 20 | 20 | 0.5 | 0.1 | 60 | 0.1 | MgPO*3 | 1 | EB*4 | Radial | 70 |
| 3 | 5.0 | 5.0 | 0.005 | 20 | 20 | 0.5 | 0.1 | 60 | 0.1 | MgPO*3 | 1 | EB*4 | Para*6 | 70 |
| 4 | 1.0 | 5.0 | 0.005 | 20 | 20 | 0.5 | 0.1 | 60 | 0.1 | MgPO*3 | 1 | EB*4 | Para*6 | 70 |
| 5 | 5.0 | 2.0 | 0.005 | 20 | 20 | 0.5 | 0.1 | 60 | 0.1 | MgPO*3 | 1 | EB*4 | Para*6 | 70 |
| 6 | 1.5 | 2.5 | 0.005 | 20 | 20 | 0.5 | 0.1 | 60 | 0.1 | MgPO*3 | 1 | EB*4 | Para*6 | 70 |
| 7 | 1.5 | 2.5 | 0.005 | 20 | 20 | 0.5 | 0.1 | 60 | 0.1 | MgPO*3 | 1 | EB*4 | Para*6 | 70 |
| 8 | 1.5 | 2.5 | 0.005 | 20 | 20 | 0.5 | 0.1 | 60 | 0.4 | MgPO*3 | 1 | EB*4 | Para*6 | 70 |
| 9 | 1.5 | 2.5 | 0.005 | 60 | 50 | 0.5 | 0.1 | 60 | 0.1 | MgPO*3 | 1 | EB*4 | Para*6 | 70 |
| 10 | 1.5 | 2.5 | 0.005 | 20 | 20 | 0.5 | 0.1 | 60 | 0.1 | MgPO*3 | 1 | IA*5 | Para*6 | 70 |
| 11 | 1.5 | 2.5 | 0.005 | 20 | 20 | 0.5 | 0.1 | 60 | 0.1 | MgPO*3 | 1 | IA*5 | Para*6 | 2 |
| 12 | | | | | | | | Ferrite Core | | | | | | 70 |

TABLE 1-continued

|   | Welded | | Result | | | |
|---|---|---|---|---|---|---|
| No | Pipe Inner Diameter mm | Distance* mm | Rate of Making Pipe m/min | Number of Times[*7] | Life hr | Remarks |
| 1 | 150 | 50 | 40 | 10 | 40 | EXAMPLE |
| 2 | 150 | 50 | 40 | 10 | 40 | EXAMPLE |
| 3 | 150 | 50 | 50 | 14 | 50 | EXAMPLE |
| 4 | 150 | 50 | 30 | 4 | 6 | COMP. EX. |
| 5 | 150 | 50 | 30 | 3 | 5 | COMP. EX. |
| 6 | 150 | 50 | 30 | 12 | 40 | EXAMPLE |
| 7 | 700 | 320 | 25 | 10 | 30 | EXAMPLE |
| 8 | 150 | 50 | 30 | 2 | 2 | COMP. EX. |
| 9 | 150 | 50 | 30 | 6 | 9 | COMP. EX. |
| 10 | 150 | 50 | 30 | 8 | 17 | EXAMPLE |
| 11 | 150 | 50 | 10 | 7 | 15 | EXAMPLE |
| 12 | 150 |  | 30 | 2 | 2 | COMP. EX. |

*The minimum distance between the pipe inner wall and a portion of the laminations placed in the pipe, the portion being the closest to the center of the pipe.
[*1]R represents resistivity.
[*2]T represents thickness.
[*3]MgPO represents magnesium phosphate.
[*4]EB represents end binding.
[*5]IA represents interlayer adhesion.
[*6]Para represents parallel.
[*7]Number of Times represents the number of times an impeder can be repeatedly used.

INDUSTRIAL APPLICABILITY

According to the present invention, the following advantages can be obtained in a process of manufacturing a welded pipe: the significant extension of the impeder life, increase in the number of times an impeder is repeatedly used, and increase in welding efficiency.

What is claimed is:

1. An impeder for manufacturing a welded pipe comprising laminations including coated steel sheets formed by providing an insulating coating on untreated steel sheets having a thickness of 0.3 mm or less and an insulating case containing the laminations, wherein the steel sheets contain 1.5–20 mass % of Cr, 2.5–10 mass % of Si, and 100 mass ppm or less of C and N in total, or further contain one or more of Al, Mn, and P, where the content of Al is 5 mass % or less and the content of each of Mn and P is 1 mass % or less, the remainder being Fe and unavoidable impurities.

2. The impeder according to claim 1, wherein the steel sheets have a resistivity of 60 $\mu\Omega$·cm or more.

3. The impeder according to claim 1, wherein the laminations include the coated steel sheets directly stacked and laminated.

4. The impeder according to claim 1, wherein the laminations are contained in the insulating case with a filling factor of 3% or more.

* * * * *